Dec. 5, 1933.    E. D. CAMPBELL ET AL    1,937,546
AIR CONDITIONING SYSTEM
Filed March 16, 1932    5 Sheets-Sheet 1
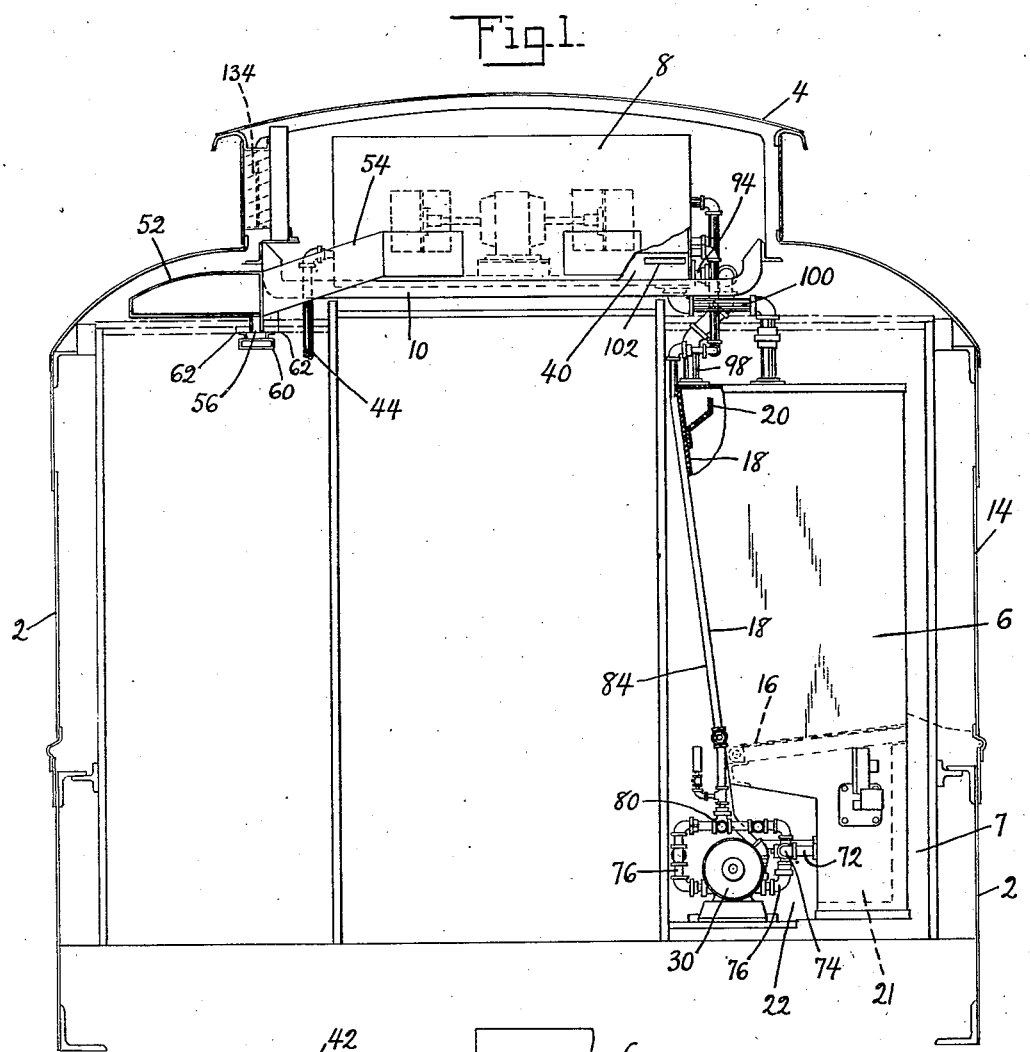
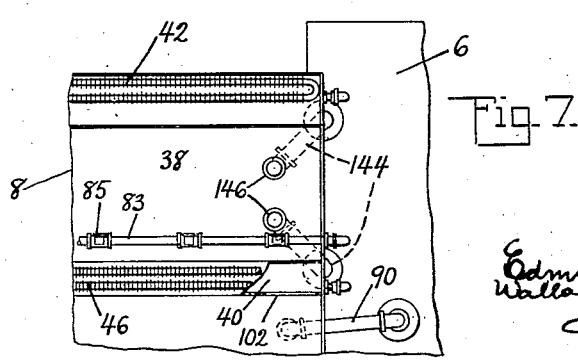

Dec. 5, 1933.    E. D. CAMPBELL ET AL    1,937,546
AIR CONDITIONING SYSTEM
Filed March 16, 1932    5 Sheets-Sheet 3
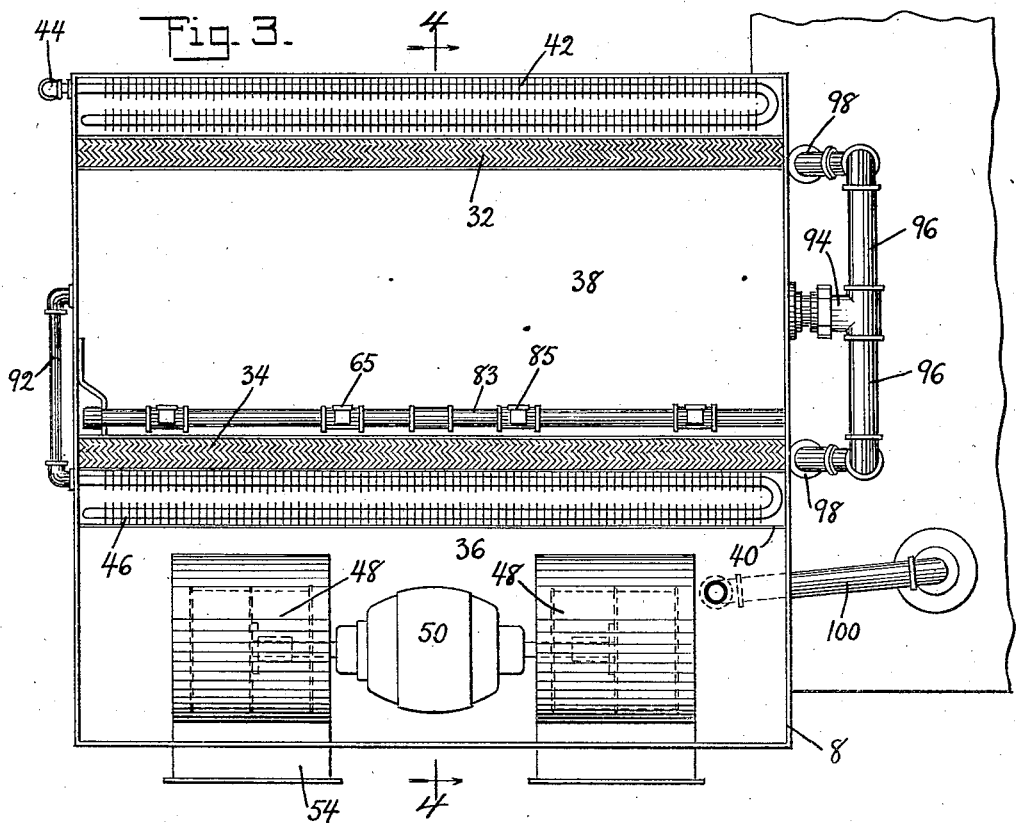
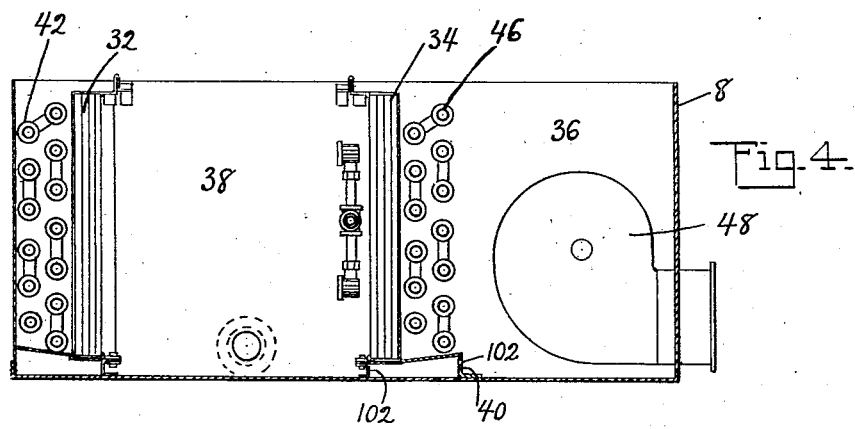

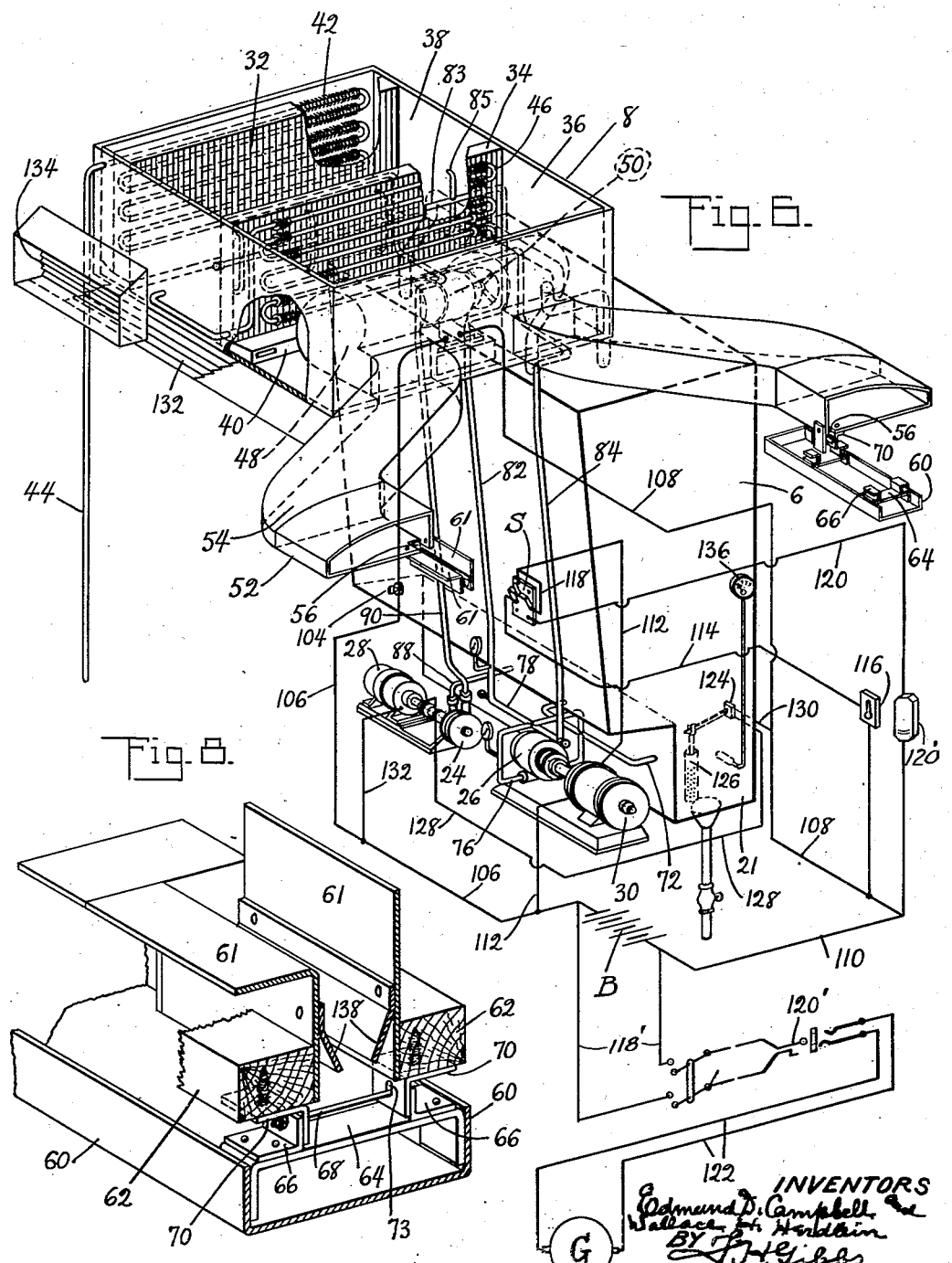

Patented Dec. 5, 1933

1,937,546

UNITED STATES PATENT OFFICE 1,937,546

AIR CONDITIONING SYSTEM

Edmund D. Campbell, University City, and Wallace H. Herdlein, St. Louis, Mo., assignors to American Car and Foundry Company, New York, N. Y., a corporation of New Jersey Application March 16, 1932. Serial No. 599,178

25 Claims. (Cl. 257—7)

This invention relates to air conditioning systems and has particular reference to a system adapted particularly for use with railway passenger cars.

One object of this invention is the provision of a simple and comparatively inexpensive, compact construction for use with railway passenger cars which is operative to introduce air into the car from a duct or ducts arranged adjacent the roof of the car after the air has been cleansed.

Another object of this invention is the provision of an air conditioning system for railway cars which is adapted to be installed in a passenger car without great modification or rearrangement of the parts thereof, which system is adapted to first cool the air, then wash it and then, if desired, further reduce the temperature of the air and then inject it into the interior of the passenger car from points adjacent the roof thereof.

The present invention contemplates the use of water ice as a refrigerating medium, the water melting therefrom being utilized to cleanse or wash air which is drawn through the system, means being provided for recooling the water after it has cleansed the air whereby the same is adapted for recycling for further use as a cleansing agent.

A further object of this invention is the provision of an air conditioning system in which cooled water is sprayed into the air whereby to cleanse the same, the water then being returned to be recooled and recycled to again function as a cleansing agent; the present system including a continuous cycle of the water for cleansing purposes, and said system also having provision whereby excess water to be discharged from the system is put to work as an initial cooling agent for air to be conditioned.

The present invention also provides an air conditioning system for use with railway passenger cars which is simple and inexpensive to manufacture and install and which has provision for cleansing and cooling the air and for dehumidifying the air.

This invention also contemplates a new and improved method for conditioning air for a passenger car.

Other objects and advantages of this invention will be apparent from the following description taken in conjunction with the accompanying drawings in which:

Figure 1 is a view looking through the railway car toward one end thereof, portions of the car being shown diagrammatically and the view showing the device of the present invention applied to the car.

Fig. 3 is a top plan view of the air conditioning cabinet with the top wall thereof removed, the view also showing certain external piping connections.

Fig. 4 is a sectional view on the line 4—4, Fig. 3.

Fig. 6 is an isometric view of the system of the present invention.

Fig. 7 is a fragmentary view of a portion of the air conditioning cabinet showing a modification of the means for draining the spray chamber, and Fig. 8 is a fragmentary detailed view in perspective showing more clearly the means for attaching the baffles into which conditioned air from the system is directed.

Figure 5:
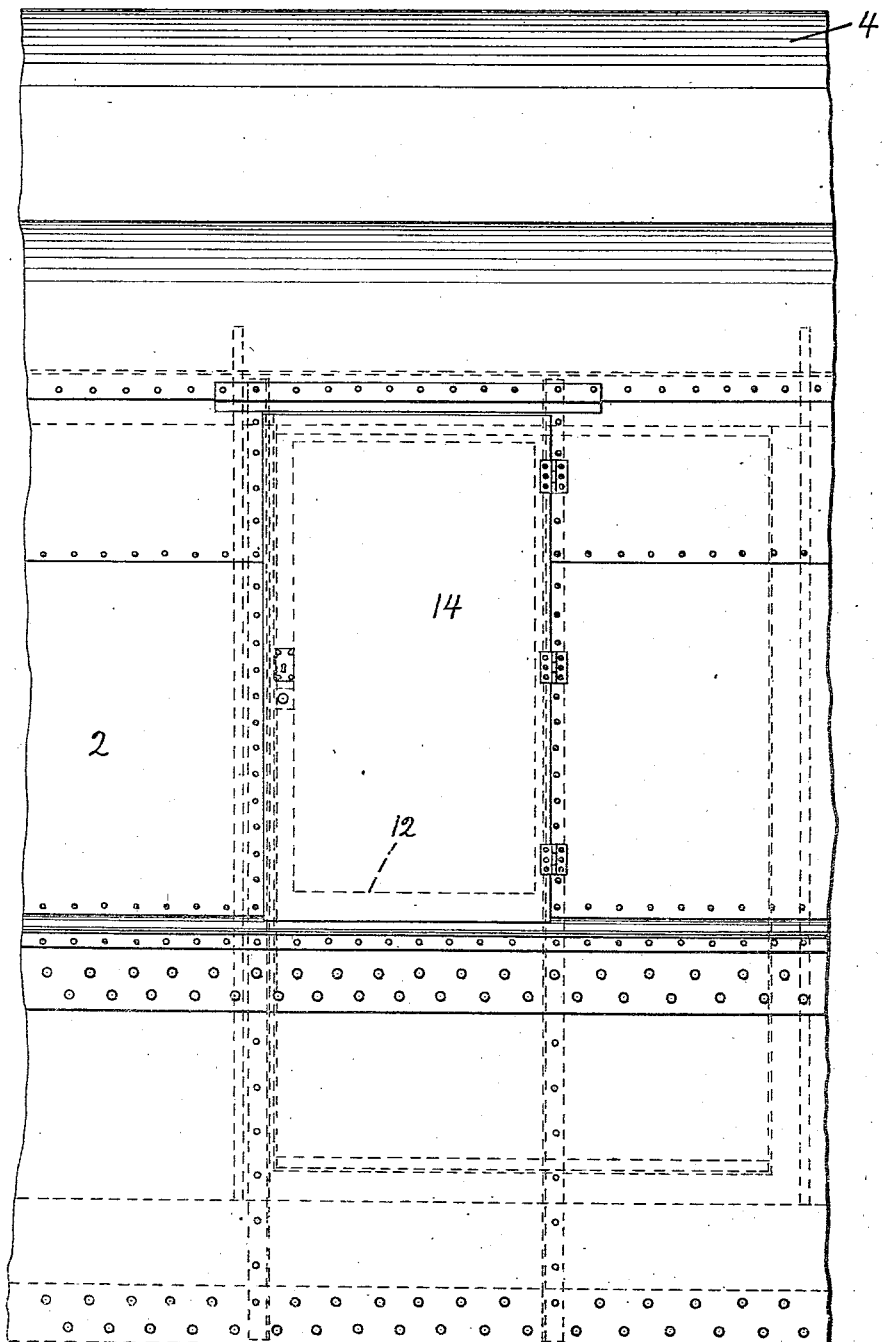
Fig. 5 is a view in side elevation of a portion of the side wall of a railway passenger car showing the icing door for the system.

Referring now more particularly to the drawings, portions of a passenger car are diagrammatically illustrated in Fig. 1 including side walls 2 and a roof 4. Inasmuch as the system of the present invention is adapted for installation with the usual passenger car the detailed construction of the latter is not believed necessary. The air conditioning system of the present invention uses water ice as the cooling medium and includes an ice chamber 6 arranged in a suitable compartment 7 adjacent one end of the car, and an air conditioning cabinet 8 supported on brackets 10 suitably secured adjacent the roof 4. The ice chamber 6 is provided with a door 12 indicated in broken lines in Fig. 5, alined with a door 14 in the side wall of the car body to permit the placing of ice in the ice chamber 6 on a grate 16 which slopes downwardly toward the rear wall 18 of the ice chamber. The rear wall 18 slopes upwardly and outwardly as clearly shown in Fig. 1 and adjacent the top of the chamber a perforated drip trough 20 is secured thereto in any suitable or desired manner. The lower end portion of the ice chamber is reduced in depth and constitutes a water tank or reservoir 21 for receiving water as it melts from the ice on grate 16, the reduction in depth of the ice chamber 6 providing an area 22 within the compartment 7 in which pumps 24 and 26 and their operating motors 28 and 30 respectively are positioned.

The cabinet 8 receives air to be conditioned and, as shown clearly in Fig. 3, is divided by means of spaced eliminators 32 and 34 respectively into a blower chamber 36 and a spray chamber 38, the eliminators being mounted on suitable supporting elements 40 secured to the bottom of the cabinet and preferably extending between the side walls thereof. The rear end of the cabinet is open for the admission of air and a heat exchange coil of the fin type indicated at 42 is arranged adjacent the eliminator 32, said coil receiving water from the tank 21 in a manner hereinafter more clearly described and discharging the water through a pipe 44 from where it may be taken outside the car.

Arranged within the blower chamber 36 adjacent the eliminator 34 is a heat exchange coil 46 of the fin type also adapted to receive water from the water tank. Blowers 48 are arranged in the chamber 36 and are operated by a motor 50 to draw air into the cabinet for conditioning and to force the air into ducts 52 connected by means of connecting ducts 54 with the blowers.

The ducts 52 extend longitudinally of the car as shown in Fig. 1 and at intervals are provided with slots 56 through which the air passes into the interior of the car. In order that the air may not be forced from the ducts immediately onto the passengers, pans 60 are provided below the slots 56 which serve as baffles to interrupt down draft of the air and cause the latter to spill over the side walls thereof into the interior of the car.

In practice, as shown more clearly in Fig. 8, plates 61 are secured to the ducts 52 at the slots 56 and extend and may be connected to furring strips 62 to define an air passage from the ducts. The pans 60 are preferably continuous from end to end of the passenger compartment and are provided with straps 64 to which angle clips 66 are secured, said clips 66 being adapted for connection by tie bolts 68 to angle clips 70 secured to the furring strips 62; the clips 70 being slotted as at 73 to permit vertical adjustment of the pans 60 relative to the furring strips as will be apparent. Preferably the ducts 52 are concealed from view in any suitable manner during the installation of the system in the car but inasmuch as the means for concealing the ducts forms no part of the air conditioning system per se the construction is not specifically illustrated.

A pipe 72 has its ends extended into the water tank 21 and is connected by a coupling 74 and a pipe 76 to the pump 26; the pipe 76 being connected to a branch 78 having valved couplings 80 at the ends thereof to which pipes 82 and 84 respectively are connected; pipe 82 being connected with a spray 83 arranged in the spray chamber 38 adjacent the eliminator 34 and being provided with spray nozzles 85, while the pipe 84 leads to the before mentioned heat exchange coil 46. For operating the valves in couplings 80 to control flow into pipes 82 and 84 operators such as hand wheels 86 or the like connected to the valve stems are provided as shown more clearly in Fig. 2.

A pipe 88 leads from the water tank 21 to the pump 24 to take water from the tank and direct it to the coil 42 through a pipe 90 connected with the pump 24.

Extending from the end of the coil 46 is a drain pipe 92 which leads into the spray chamber 38.

Water sprayed from the nozzles 85 into chamber 38 is drained from the chamber through a T 94 and a drain pipe 96 having its opposite ends discharging at 98 into the ice chamber immediately above the trough 20 as shown in Fig. 1. Due to this arrangement the water may drip onto the ice because the sloping grate 16 always maintains the ice in contact with the rear wall 18 whereby the wall is in heat exchange relation with the ice, or the water may flow down the wall 18 into the tank 21, contacting with the ice during its travel; the wall 18 and the ice receiving the heat units from the water whereby the latter is cooled prior to being recycled. Extending from the blower chamber 36 into the ice chamber is a drain pipe 100 for the purpose of draining any water which may possibly collect in chamber 36 to the ice chamber 6. As clearly shown in Fig. 4, the support 40 for the eliminator 34 is slotted as shown at 102 to permit drainage between chambers 38 and 36 in the event that the drain 94 and 96 from the chamber 38 becomes clogged.

The motor 50 is controlled by a switch 104 in a conductor 106 which leads from the motor to the battery B. The electric circuit for the motor 50 also includes a conductor 108 leading from the motor to a conductor 110 connected as shown in Fig. 6 to the opposite side of the battery B. Current from the battery B for the motor 30 is controlled by a switch S and when said switch is closed on the upper terminals it can be seen that a circuit is established from the battery through a conductor 112, then through the upper terminals of switch S through a conductor 114 and automatic switch mechanism such as a thermostat 116 to the conductor 108 connected to conductor 110 and then to the battery.

The lower terminals of the switch S are to be used during seasons when the thermostat 116 is not in use, such for example as during cool or cold weather when the system operates only by water in the tank 21 and no ice is required. It can be seen that when the switch S is closed on the lower terminals a circuit is established from the battery through conductors 112 and 118 to conductor 120 connected to the battery through conductor 110. Obviously instead of a single switch S a pair of individual switches may be employed. Arranged in conductor 120 is a humidostat 120', the purpose of which will be hereinafter more clearly pointed out.

The battery B in travel of the car is adapted to be charged in the usual manner as by means of a generator actuated by the car axle and connected with the battery by means of leads 118' (see Fig. 6). In order to maintain the battery charged while the car remains stationary, such for example as when it is waiting in a station, the system is adapted to be connected with a generator G from a main source of supply by means of a plug 120' to connect the battery for charging with a circuit 122 which includes the before mentioned generator G. The battery B may be the usual battery of the kind now employed for the lighting circuit for the reason that the present system adds very little to the normal lighting functions of the battery.

The system of the present invention, as before mentioned, uses water ice as a refrigerating medium. The ice chamber may be and preferably is suitably insulated and as the ice melts the water collects in the tank 21. When the motor 30 is in operation and the valve 36 controlling admission of water to pipe 84 is closed, water from the tank will be forced through pipe 82 into the spray pipe 83 and then from the nozzles 85 into the chamber 38 from where it drains back into the ice chamber through the T 94 and pipe 96, being discharged into the perforated trough 20 and dripping either directly onto ice on grate 16 where it is cooled before passing into the tank 21 or coursing down the wall 18 to be cooled thereby and also by the ice on the grate 16. It will be apparent that the system of the present invention is adapted to use the same water over and over again as the heat units taken from the air by the water are thermally conducted to the walls of the ice chamber and then to the ice.

The motor 28 is operated only when an excess of water is present in tank 21 and it is controlled by a suitable switch 124 adapted to be closed by a float 126 when the water in tank 21 reaches a predetermined amount; the switch 124 being connected to the motor by a conductor 128 and to the battery by a conductor 130 connected with conductor 108. Extending from the conductor 106 leading from the battery is a conductor 132 connected to the motor 28 so it can be seen when the switch 124 is closed a circuit is established from the battery through 106 and 132 to the motor 28, and from the motor through 128, switch 124 and conductor 130 to conductors 108 and 110 to the battery. When the pump 24 is in operation it will be obvious that the water from the tank 21 is taken through pipe 90 to the coil 42 and then discharged through pipe 44 outside the car; the motor continuing its operation until the excess water in tank 21 has been discharged and the float 126 has opened the switch 124. The present system therefore includes means whereby excess water collecting from the water ice is caused to perform the work of cooling the air upon its entrance into the air conditioning cabinet 8 before said water is discharged from the system.

During operation of the pump 26 water from the tank 21 may also be forced through the coil 46 by opening the valve 86 at the lower end of pipe 84 and after the water has passed through the coil 46 it is returned to the ice chamber by being discharged into the spray chamber 38 through the pipe 92 to be drained through the T 94 and drain pipe 96.

The system of the present invention is designed for recycling and continuously conditioning air in a passenger car, and the air conditioning cabinet 8 is built into the car adjacent the roof so as to be concealed from view. To permit the air from the interior of the car to pass into the air conditioning cabinet 8 suitable means such as the adjustable louvers 132 are provided so that the air may enter cabinet 8. In case a replenishment of air is desired or, in the event of cold weather when it is not necessary to use water ice for cooling the air, the device is adapted to receive air from outside the car to be conditioned in the cabinet 8, and as clearly shown in Fig. 1 shutters 134 are provided to permit the outside air to enter the system adjacent the roof 4 of the car. Obviously by suitable adjustment of the shutters 134 and louvers 132 the air admitted to the cabinet 8 may be predetermined.

Following icing of the chamber 6, the motor 30 is operated to cause water melting from the ice to be sprayed into chamber 38 and returned to the ice chamber and water tank. This is continued for a time prior to operation of the blowers in order that the water in tank 21 may be cooled to an amount sufficient to prevent the blowing of warm moist air into the passenger compartment. When the water in tank 21 has reached a temperature which may be determined by the thermometer 136 the motor 50 may be started to cause air to be drawn into the cabinet from the passenger compartment; the air first passing through the eliminator 32 and then into the spray chamber 38 where it is washed and humidified by the water from the nozzles 85 and from there it passes through the eliminator 34 where the excess or entrained moisture content of the air is removed and then into the blower chamber 36 through the coil 46 and the blowers force the air through the connections 54 into the ducts 52 to be passed into the passenger compartment of the car through the slots 56. The present invention also contemplates the provision of means for regulating the amount of air which passes through the slots 56 into the passenger compartment of the car in order that the amount of air passing through the several slots 56 may be uniform and, as clearly shown in Fig. 8, the air passages defined by plates 61 are provided with weirs 138 adapted to be adjusted by bending to restrict the extent of air opening to the desired amount whereby uniform quantities of air may be injected into the passenger compartment of the car for the full length of the ducts 52.

Figure 2:
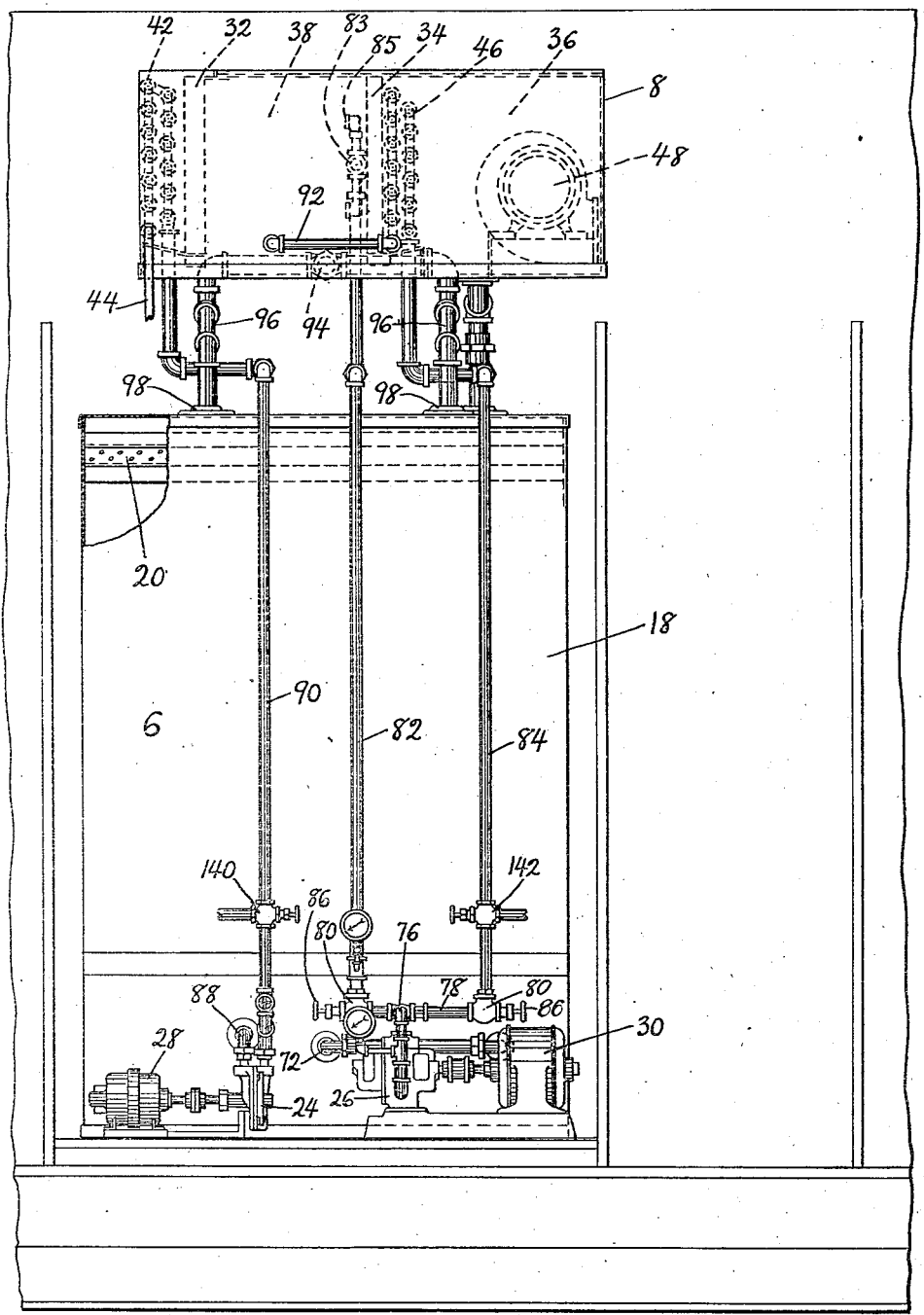
Figure 2 is a view showing the device of the present invention in side elevaton applied to a railway car, portions only of the latter being shown diagrammatically, the view having portions of the ice chamber broken away to disclose the interior thereof.

In service during the times when it is not desired to cool the air the present system is designed to heat the air. As mentioned before, when water ice is not employed in chamber 6, water is placed in the tank 21 and is circulated through the spray chamber and then back to the tank. Due to the humidification of the air by the spray it may be desirable to raise the temperature of the air before passing it into the passenger compartment and, as shown in Fig. 2, a valved coupling 140 is arranged in pipe 90 and is adapted for connection with the train steam line whereby upon operation of the valve in said coupling steam may be passed into the pipe 90 and through the heat exchange coil 42 and discharged from the system through pipe 44. This arrangement obviously initially heats the air at the entrance portion of the cabinet 8. Pipe 84 is also provided with a valved coupling indicated at 142 adapted for connection with the train steam line for conducting steam to coil 46 to heat the air after dehumidification in eliminator 34 and prior to its discharge into the passenger compartment. The admission of steam as just described may be controlled either manually or automatically such as by means of a suitable thermostat, and obviously the relative humidity of the air may be controlled by the humidostat 120', which determines the operation of pump 26.

The construction just described has particular reference to service conditions in which water ice is not used. It is apparent to anyone that at certain times it may be necessary to use water ice, but the cold water circulated through the heat exchange coils may be of such temperature as to render the air forced into the passenger compartment of the car at a temperature too low for comfort. This condition might prevail during certain times of the year in which, if water ice is not used, water alone might cause the air forced into the passenger compartment of the car to be at a temperature in excess of that desired. In view of this condition, at such times, it is necessary that the air after being subjected to a spray of cold water be increased in temperature above that prevailing when it leaves the spray chamber. To this end the pipe 84 is provided with the before mentioned valve 142, which may be operated to inject steam from the steam line of the car into the water forced through the pipe by the pump 26, whereby the temperature of the water forced through the heat exchange coil 46 is raised so that the air, after leaving the spray chamber 38, may be increased in temperature to a pre-determined degree prior to being forced into the passenger compartment of the car. The valve 142 therefore is adapted to control the passage of fluid to the coil 46 and obviously is operative to effect passage of water or steam, or a combination thereof as desired, to said coil; the combination of water and steam obviously resulting in increasing the temperature of the water which is forced to the coil. Obviously water ice is not required during certain seasons of the year and unless the air is conditioned by increasing the temperature thereof the air admitted into the passenger compartment of the car would be too cold for comfort.

From the above description it is believed that those skilled in the art will recognize that the water melting from the ice is caused to perform the work of washing the air and taking heat units therefrom over and over again until it is finally discharged from the system and that just prior to discharge from the system it functions to take heat units from the air just entering the cabinet to be conditioned. The system depends to a great extent on the well-known law of gravity and hence, in view of the fact that the water after having taken heat units from the air returns by gravity for re-cooling the system, is a thermogravity system.

Fig. 7 discloses a modified form of drainage from the spray chamber 38 in which two independent drain pipes 144 are provided which are connected to the bottom wall of the spray chamber as at 146 and are each adapted to drain water from said chamber 38 back to the ice chamber 6 by discharging the water into the drip trough 20.

The drawings herein disclose one form of the present invention but it is to be understood that they are for illustrative purposes only and various changes in the form and proportions of the construction may be made within the scope of the appended claims without departing from the spirit of the invention.

What is claimed is:

1. In an air conditioning system adapted to and using water ice, an ice chamber, an air conditioning cabinet having a spray chamber, substantially continuously operating means for forcing water from the ice chamber to the spray chamber, means for returning the water from the spray chamber to the ice chamber, a cooling coil in the cabinet having a discharge means out of the system, and intermittently operating pump means for conducting excess water from the ice chamber to the cooling coil.

2. In an air conditioning system adapted to and using water ice, an ice chamber, an air conditioning cabinet having a spray chamber, substantially continuously operating means for forcing water from the ice chamber to the spray chamber, means for returning the water from the spray chamber to the ice chamber, said means being so arranged as to discharge the water on the ice whereby it is recooled, a cooling coil in the cabinet having a discharge means out of the system, and intermittently operating pump means for conducting excess water from the ice chamber to the cooling coil.

3. In an air conditioning system adapted to and using water ice, an ice chamber, an air conditioning cabinet having a spray chamber, means for drawing air through said cabinet, pump means for circulating water melting from the ice from the ice chamber to the spray chamber and back to the ice chamber, trough means in the ice chamber for directing the returning water directly onto the ice for recooling, a cooling coil at the air inlet portion of the cabinet having its discharge end outside the system, means for forcing water from the ice chamber through the cooling coil, pump means adapted to be operated only upon and in response to excess water in the ice chamber for conducting excess water through the cooling coil and out of the system.

4. In an air conditioning system, an ice chamber, a cabinet receiving air to be conditioned and provided with a cooling coil and a spray chamber, means for conducting water melting from the ice in the ice chamber to the spray chamber, means for returning the water from the spray chamber to the ice chamber, and pump means set in operation automatically by water in the ice chamber upon increase thereof beyond a predetermined amount for forcing the excess water through the cooling coil and out of the system.

5. In an air conditioning system, an ice chamber for holding water ice, a cabinet for receiving air to be conditioned and provided with a spray chamber and a cooling coil, means for conducting water from the ice chamber to the spray chamber, return means for the water from the spray chamber to the ice chamber so arranged as to discharge the water on the ice whereby to cool the water, means for conducting water from the ice chamber to the cooling coil including a pump, and means operative in response to excess water in the ice chamber for actuating the pump.

6. In an air conditioning system for passenger cars, an ice chamber arranged adjacent a side wall of the car, an air conditioning cabinet adjacent the car roof, means for circulating water melting from the ice in said chamber to the cabinet, a drain from the cabinet adapted to return the water therefrom to the ice chamber for recooling, a heat exchange coil in the cabinet, a pump for forcing water from the ice chamber to the coil, and float controlled means operative by water in the ice chamber beyond a predetermined amount for intermittently operating the pump.

7. In an air conditioning system, a chamber having a sloping grate therein for supporting water ice in direct heat exchange relation with a wall thereof, a drip trough secured to said wall, a cabinet having a spray chamber, a spray device in said chamber receiving water melting from the ice in the ice chamber, means for drawing air through the cabinet to be cleansed and humidified in the spray chamber, dehumidifying means for the air forming one of the walls of the spray chamber, and means for draining water from the spray chamber to the drip trough to permit the said water to drop onto the ice adjacent the wall with which it contacts whereby the circulated water is recooled.

8. In an air conditioning system, a chamber having a sloping grate therein for supporting water ice in direct heat exchange relation with a wall thereof, a drip trough secured to said wall, a cabinet having a spray chamber, a spray device in said chamber receiving water melting from the ice in the ice chamber, means for drawing air through the cabinet to be cleansed and humidified in the spray chamber, dehumidifying means for the air forming one of the walls of the spray chamber, a heat exchange coil in the cabinet adjacent the air entrance portion and provided with a discharge outside the system, and pump means operative intermittently for removing excess water from the ice chamber, said means being adapted to circulate said water through the heat exchange coil.

9. In an air conditioning system for passenger cars, an air conditioning cabinet adjacent the car roof and provided with a cooling coil and a spray chamber, means for drawing air through the cabinet, an eliminator forming a wall of the chamber, a duct adjacent the roof adapted to receive air from the cabinet and provided with discharge openings, adjustable elements in said openings for controlling discharge of air therethrough into the passenger compartment of the car, a container for water arranged adjacent one side wall of the car, substantially continuously operating means for spraying water from the container into the spray chamber to cleanse and humidify the air, and intermittently operating pump means for conducting water in the container to the cooling coil for discharge out of the system.

10. In an air conditioning system, an ice chamber having supporting means for retaining water ice in heat exchange relation with a wall thereof at all times, a cabinet having a spray chamber, a dehumidifying element forming a wall of the spray chamber, a blower chamber in the cabinet, blowers in the blower chamber for drawing air into and through the cabinet, a substantially continuously operating pump for forcing water from the ice chamber to the spray chamber, means for draining the water from the spray chamber into the ice chamber, said means being so arranged that the returning water is drained onto the before mentioned ice chamber wall to be directed to the ice in contact therewith, a cooling coil at the air entrance portion of the cabinet having a discharge outside the system, a pump for forcing water from the ice chamber to the cooling coil, and control means for said last named pump operative by and upon increase of water in the ice chamber beyond a predetermined amount.

11. In an air conditioning system for passenger cars, a closed chamber positioned adjacent a side wall of the car and adapted to receive water and water ice, a cabinet adjacent the car roof, means for passing air through the cabinet to be conditioned therein and delivered into the passenger compartment of the car, said cabinet having a spray chamber and a blower chamber, heat exchange coils at the air inlet portion of the cabinet and in the blower chamber, respectively, pump means for maintaining a substantially continuous circulation of water between the closed chamber and spray chamber, and an intermittently operating pump element for conducting water from the tank to the coil at the air inlet portion of the container.

12. In an air conditioning system, a closed chamber for receiving water and having provision for supporting water ice, a cabinet having a spray chamber, blower means for passing air through the cabinet, a spray device in the spray chamber, a dehumidifying element in the cabinet, a heat exchange coil connected with the chamber and discharging outside the system, a pipe for conducting water from the closed chamber to the spray chamber into the air passing through the latter, a substantially continuously operating pump for forcing the water through said pipe, drain means for returning the water from the spray chamber to the closed chamber to be recirculated by the pump, and an intermittently operating pump for forcing water from the closed chamber through the said coil to discharge excess water from the system.

13. In an air conditioning system, a chamber holding water ice, a cabinet, a cooling coil and a spray pipe in the cabinet, means for conducting water melting from the ice to the spray pipe for discharge into the cabinet, means for returning the water from the cabinet to the ice chamber for recooling, and pump means operable automatically upon increase of water in the ice chamber for conducting excess water from the ice chamber through the cooling coil.

14. In an air conditioning system adapted to and using water ice as a cooling medium, an ice chamber for holding water ice, an air conditioning cabinet, a cooling coil and a spray pipe in the cabinet, the latter being adapted to spray water into the cabinet, means for conducting water which has melted from the ice to the spray pipe, drain means for returning the sprayed water to the ice chamber so arranged as to direct the water to the ice for recooling, and means acting automatically upon increase of water beyond a predetermined amount in the ice chamber for forcing excess water through the cooling coil and out of the system.

15. The method of conditioning air in a passenger car which comprises passing cool water from a refrigerating tank to a spray chamber, returning the water to the refrigerating tank to be recooled, intermittently conducting water from the storage tank to a cooling surface and discharging the water outside the system, and passing air over the cooling surface into the spray chamber and discharging it into the passenger compartment of the car.

16. In an air conditioning system for passenger cars, a cabinet adapted to be positioned adjacent the car roof and having an air entrance opening, spaced eliminators in the cabinet dividing the latter into a spray chamber and a blower chamber, heat exchange coils at the air entrance portion and in the blower chamber respectively adapted to receive a fluid, means for discharging fluid from the coil in the air entrance portion outside the system, drain means from the coil in the blower chamber to the spray chamber and blowers in the blower chamber for drawing air through the cabinet.

17. In an air conditioning system for passenger cars, a closed chamber positioned adjacent a side wall of the car and adapted to receive water and water ice, a cabinet adjacent the car roof, means for passing air through the cabinet to be conditioned therein and delivered into the passenger compartment of the car, said cabinet having a spray chamber and a blower chamber, heat exchange coils at the air inlet portion of the cabinet and in the blower chamber respectively, pump means for maintaining a substantially continuous circulation of water between the closed chamber and spray chamber, an intermittently operating pump element for conducting water from the tank to the coil at the air inlet portion of the container; and valve means connected with a source of heating medium and operative to control the feeding of water and heating medium to said coils to vary the temperature of said heat exchange coils.

18. In an air conditioning system for passenger cars, a water storage tank, a cabinet, a spray chamber in the cabinet, means for forcing air through the cabinet into the passenger compartment of the car, a heat exchange coil in the cabinet adjacent the air exit end portion thereof, means for maintaining a substantially continuous circulation of water between the storage tank and spray chamber and said heat exchange coil to humidify and dehumidify the air respectively, means for admitting steam to said heat exchange coil, valve means for controlling the admission of water and steam to said heat exchange coil, and a heat exchange coil at the air entrance end portion of the cabinet receiving water from said storage tank independently of the passage of water to said spray chamber.

19. In an air conditioning system for railway passenger cars in which water ice is employed for providing water at a low temperature for washing air, an ice chamber and water storage tank comprising a closed container formed of material possessing high heat conductive properties and having a wall thereof sloping upwardly and outwardly from adjacent the bottom, an ice supporting grate in the container sloping downwardly towards said wall so as to support ice at all times in direct heat exchange relation with said wall, said grate being arranged in spaced relation relative to the bottom of the container so that the portion of said container therebelow constitutes a water storage area, and a drip trough secured to the upper portion of the sloping wall so arranged on said wall as to discharge water onto the latter above the ice so that at least some of the heat units in the water are removed prior to contact with the ice.

20. In an air conditioning system for railway passenger cars in which water ice is employed for providing water at a low temperature for washing air, an ice chamber and water storage tank comprising a closed container having its lower end portion reduced in diameter to provide a water storage area, said container having one wall thereof sloping upwardly and outwardly from adjacent the upper portion of said water storage area, an ice supporting grate in the container above the water storage area inclined downwardly to and connected with the sloping wall of the container, said grate being adapted to support water ice at all times in direct heat exchange relation with said wall, and a drip trough secured to the upper portion of the sloping wall so arranged as to discharge water onto said wall above the ice so that at least some of the heat units in the water are removed prior to contact of water with the ice.

21. In an air conditioning system for passenger cars, a chamber holding water ice, a cabinet having water spray devices therein, a heat exchange coil in said cabinet, means including a pump operative intermittently to force excess water from the chamber through said heat exchange coil, and means including a pump operative in response to variations in temperature within the passenger compartment of the car for effecting circulation of water between the chamber and water spray devices.

22. In an air conditioning system for passenger cars, a chamber holding water ice, a cabinet having water spray devices therein, a heat exchange coil in said cabinet, means including a pump operative in response to variations in water level in said chamber for forcing water from the chamber to said heat exchange coil, and means including a pump operative in response to variations in temperature within the passenger compartment of the car for effecting circulation of water between the chamber and water spray devices.

23. In an air conditioning system for passenger cars, a chamber holding water ice, a cabinet having water spray devices therein, a heat exchange coil at the entrance portion of said cabinet having one end thereof discharging outside the car, means including a pump operative in response to variations in water level in said chamber to force excess water from the chamber through said heat exchange coil and out of the system, and means including a pump operative in response to variations in temperature within the passenger compartment of the car for effecting circulation of water between the chamber and water spray devices.

24. In an air conditioning system for passenger cars, a water storage tank, a cabinet, a spray chamber in the cabinet, means for forcing air through the cabinet into the passenger compartment of the car, means for maintaining a substantially continuous circulation of water between the storage tank and spray chamber to humidify and cleanse air passing through the cabinet, a heat exchange coil in the cabinet and means including a pump operative in response to variations in water level in the storage tank for conducting water from said tank to said heat exchange coil.

25. In an air conditioning system for passenger cars, a water storage tank, a cabinet, a spray chamber in the cabinet, means for forcing air through the cabinet into the passenger compartment of the car, means for maintaining a substantially continuous circulation of water between the storage tank and spray chamber to humidify and cleanse air passing through the cabinet, a heat exchange coil in the cabinet having a discharge end out of the car, and means including a pump operative in response to variations in water level in the storage tank for conducting water from said tank to the coil and out of the system.

EDMUND D. CAMPBELL.
WALLACE H. HERDLEIN.